United States Patent
Fodor et al.

(10) Patent No.: US 9,414,424 B2
(45) Date of Patent: Aug. 9, 2016

(54) METHOD AND ARRANGEMENT FOR ADJUSTING SIGNAL-TO-INTERFERENCE-PLUS-NOISE-RATIO IN A DEVICE-TO-DEVICE COMMUNICATION

(71) Applicant: Telefonaktiebolaget L M Ericsson (publ), Stockholm (SE)

(72) Inventors: Gabor Fodor, Hässelby (SE); Marco Belleschi, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 38 days.

(21) Appl. No.: 14/408,180

(22) PCT Filed: Jun. 3, 2013

(86) PCT No.: PCT/SE2013/050642
§ 371 (c)(1),
(2) Date: Dec. 15, 2014

(87) PCT Pub. No.: WO2014/196906
PCT Pub. Date: Dec. 11, 2014

(65) Prior Publication Data
US 2015/0139111 A1    May 21, 2015

(51) Int. Cl.
*H04W 76/02* (2009.01)
*H04W 52/12* (2009.01)
(Continued)

(52) U.S. Cl.
CPC ............ *H04W 76/023* (2013.01); *H04W 52/12* (2013.01); *H04W 52/241* (2013.01); *H04W 52/383* (2013.01)

(58) Field of Classification Search
None
See application file for complete search history.

(56) References Cited

U.S. PATENT DOCUMENTS 7,899,483 B2    3/2011  Ariyur
2007/0197251 A1*  8/2007  Das .................... H04W 52/146
                                                    455/522

(Continued)

FOREIGN PATENT DOCUMENTS

WO    WO 02/03567 A3    1/2002

OTHER PUBLICATIONS

International Search Report for International Application No. PCT/SE2013/050642 mailed Aug. 6, 2013, 3 pages.

(Continued)

*Primary Examiner* — Anh Ngoc Nguyen
(74) *Attorney, Agent, or Firm* — Myers Bigel & Sibley, P.A.

(57) ABSTRACT

A method in a first wireless device for adjusting Signal-to-Interference-plus-Noise-Ratio, SINR, target and a transmit rate is provided. The first wireless device is configured to transmit data to a second wireless device over a Device-to-Device, D2D, link. The first wireless device receives a report on a control channel from the second wireless device. The report comprises a measurement of SINR on said control channel and/or a data channel transmitted by the first device. The first wireless device adjusts a transmit power for the control channel and/or the data channel based on the reported measurement of the SINR on said control channel and/or data channel transmitted by the first device. The first wireless device then adjusts a SINR target and a transmit rate based on the adjusted transmit power. The SINR target and transmit rate are to be used when transmitting on the data channel over the D2D link to the second wireless device.

20 Claims, 10 Drawing Sheets

(51) Int. Cl.
   *H04W 52/24*   (2009.01)
   *H04W 52/38*   (2009.01)

(56) References Cited

U.S. PATENT DOCUMENTS

2010/0278136 A1* 11/2010 Oyman .............. H04B 7/026
                                                          370/330
2011/0098076 A1*  4/2011 Kim ................ H04W 52/12
                                                          455/522

OTHER PUBLICATIONS

Written Opinion of the International Searching Authority for International Application No. PCT/SE2013/050642 mailed Aug. 6, 2013, 10 pages.

Fodor et al: "A Distributed Power Control Scheme for Cellular Network Assisted D2D Communications", Global Telecommunications Conference, 2011 IEEE, Dec. 5, 2011, pp. 1-6, XP032118739.

Fodor et al: "Design Aspects of Network Assisted Device-to-Device Communications", IEEE Communications Magazine, May 2011, 8 pages.

Foschini et al: "A Simple Distributed Autonomous Power Control Algorithm and its Convergence", IEEE Transactions on Vehicular Technology, vol. 42, No. 4, Nov. 1, 1993, pp. 641-646, XP000421239.

Zander: "Distributed Cochannel Interference Control in Cellular Radio Systems", IEEE Transactions on Vehicular Technology, vol. 41, Issue: 3, Aug. 1992, pp. 305-311.

3GPP "Delivering Public Safety Communications with LTE" The Mobile Broadband Standard, Updated Jul. 2013, 6 pages. Retrieved from the internet: http://www.3gpp.org/Public-Safety.

\* cited by examiner

METHOD AND ARRANGEMENT FOR ADJUSTING SIGNAL-TO-INTERFERENCE-PLUS-NOISE-RATIO IN A DEVICE-TO-DEVICE COMMUNICATION

CROSS REFERENCE TO RELATED APPLICATION

This application is a 35 U.S.C. §371 national stage application of PCT International Application No. PCT/SE2013/050642, filed in the English language on Jun. 3, 2013, the disclosure and content of which is incorporated by reference herein in its entirety.

TECHNICAL FIELD

Embodiments herein relate to a wireless device and a method therein. In particular, it relates to adjusting Signal-to-Interference-plus-Noise-Ratio (SINR) target and a transmit rate for Device to Device (D2D) communication.

BACKGROUND

Wireless devices for communication such as terminals are also known as e.g. User Equipments (UE), mobile terminals, wireless terminals and/or mobile stations. Terminals are enabled to communicate wirelessly in a cellular communications network or wireless communication system, sometimes also referred to as a cellular radio system or cellular networks. The communication may be performed e.g. between two terminals, between a terminal and a regular telephone and/or between a terminal and a server via a Radio Access Network (RAN) and possibly one or more core networks, comprised within the cellular communications network.

Terminals may further be referred to as mobile telephones, cellular telephones, laptops, or surf plates with wireless capability, just to mention some further examples. The terminals in the present context may be, for example, portable, pocket-storable, handheld, computer-comprised, or vehicle-mounted mobile devices, enabled to communicate voice and/or data, via the RAN, with another entity, such as another terminal or a server.

The cellular communications network covers a geographical area which is divided into cell areas, wherein each cell area being served by a base station, e.g. a Radio Base Station (RBS), which sometimes may be referred to as e.g. "eNB", "eNodeB", "NodeB", "B node", Base Transceiver Station (BTS), or AP (Access Point), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. One base station, situated on the base station site, may serve one or several cells. Further, each base station may support one or several communication technologies. The base stations communicate over the air interface operating on radio frequencies with the terminals within range of the base stations. In the context of this disclosure, the expression Downlink (DL) is used for the transmission path from the base station to the mobile station. The expression Uplink (UL) is used for the transmission path in the opposite direction i.e. from the mobile station to the base station.

In 3rd Generation Partnership Project (3GPP) Long Term Evolution (LTE), base stations, which may be referred to as eNodeBs or even eNBs, may be directly connected to one or more core networks.

UMTS is a third generation mobile communication system, which evolved from the GSM, and is intended to provide improved mobile communication services based on Wideband Code Division Multiple Access (WCDMA) access technology. UMTS Terrestrial Radio Access Network (UTRAN) is essentially a radio access network using wideband code division multiple access for terminals. The 3GPP has undertaken to evolve further the UTRAN and GSM based radio access network technologies.

3GPP LTE radio access standard has been written in order to support high bitrates and low latency both for uplink and downlink traffic. All data transmission is in LTE controlled by the radio base station.

Device-to-Device Communication in Cellular Spectrum

Device-to-device (D2D) communications in cellular spectrum is a relatively new concept that targets scenarios in which communicating parties are in the close proximity of each other. Such communication may be assisted by the cellular network infrastructure when it is available, or it may happen in an adhoc and autonomous fashion in case the cellular network is damaged. Specifically, in 3GPP LTE networks, such LTE Direct communication may be used in commercial applications, such as proximity based social networking or in public safety situations in which first responders need to communicate with each other and with people in the disaster area.

Within the European Conference of Postal and Telecommunications Administrations (CEPT), according to the Electronic Communication Committee (ECC) this type of direct communication is referred to as Direct Mode Operation (DMO) that is recognized as an important part of the European Public Protection and Disaster Relief (PDDR) broadband system. Power control algorithms for DMO are an important part of technical solutions for PDDR systems.

The first step in the establishment of a D2D link is that the devices discover the presence of their peer. During the discovery process, one device is assumed to be in D2D slave role, and the other user equipment in D2D master role. To implement peer discovery, the D2D master device broadcasts signals, indicating its capability to provide certain service, and the D2D slave device tries to discover the D2D master device which may provide a required service. These signals that the master device broadcasts are referred to as beacon signals. Note that a single device may play both roles, i.e. master and slave in different occasions, or even simultaneously.

National Security and Public Safety (NSPS) and Adhoc Communications

The 3GPP has recently started work on standardizing technology, that may be used in NSPS as well as regular commercial cellular services, see http://www.3gpp.orq/Public-Safety. The main business driver for using a common technology for both public safety and commercial use cases lies in the economy of scale of both network and end user equipments thereby offering advantages to both the cellular and public safety communities. However, developing a common technology for these two types of applications implies new technical requirements, such as solutions for radio resource management, interference handling and in particular power and rate control.

Power and Rate Control in Existing Cellular and Adhoc Networks

Existing power control algorithms typically aim at balancing the Signal-to-Interference-plus-Noise-Ratio (SINR) at a receiver. For example, an existing 3GPP LTE uplink power control algorithm compensates for the path loss of cell edge users allowing wireless devices far away from the base station to transmit with a somewhat higher power than wireless devices close to the base station.

Although in practice very seldom used, existing adhoc, distributed, algorithms allow wireless devices to iteratively find transmit power levels such that the SINR values at various receivers tend to become similar, even when the topology of transmitters-receivers is much more complex than the traditional cellular star topology. These algorithms are known by the skilled person as the Foschini-Miljanic type of algorithm, see G. J. Foschini, Z. Miljanic. "A simple distributed autonomous power control algorithm and its convergence", *IEEE Trans. on Vehicular Technology*, November 1993, or Zander type of algorithm, see J. Zander, "Distributed Cochannel Interference Control in Cellular Radio Systems", *IEEE Trans. on Vehicular Technology*, August 1992.

Rate control is a fundamental means in existing cellular technologies to adaptively adjust data transmission rates by employing Adaptive Modulation and Coding (AMC) schemes. Rate control and AMC, in LTE in the form of Modulation and Coding Scheme (MCS) selection, are typically controlled or assisted by a base station and appropriate signaling.

In NSPS scenarios, a cellular network may become partially damaged or dysfunctional, but a basic requirement is that communication between wireless devices such as user equipments (UEs) in the proximity of each other should be facilitated. When UEs are under cellular network coverage, the cellular network controls their transmit power and manages interference, but when UEs get outside of cellular network coverage or the cellular network becomes unable to control the UE transmit power, a basic problem is for the UEs to exercise power control and rate adaptation.

The UEs do not know what transmit powers to set when they get outside network coverage, including the situation in which some of the communicating UEs are under network coverage and some are outside network coverage.

Further, the UEs do not know how to adjust their transmit power level and control the rate such that UEs both outside and within network coverage should be able to communicate and keep the caused interference under tolerable limits.

Since existing technology for power and rate control either assumes cellular network assistance or comprises some predefined or preconfigured transmit rates and/or SINR targets, the cellular network have a problem to appropriately set the transmit power for cellular UEs when these get outside cellular network coverage. The root cause for this is that without some control entity or pre-configuration, the UEs cannot know what SINR target and corresponding power level and transmit rate they should set. Although some form of pre-configuration may be employed, a single preconfigured transmit power level would be inappropriate for UEs in different situations. A problem is that the distance between communicating UEs may vary between a large range, from a few centimeters up to several hundreds of meters, within or outside network coverage.

This basic problem leads to various negative consequences in mixed cellular and adhoc environments such as:
  If UEs try to achieve a too high SINR at their respective receivers, they may cause extremely high interference at other receivers in their close proximity;
  If UEs aim at too low SINRs, their feasible communication rates may be much lower than what would be feasible with some higher SINR values;
  If a UE under cellular coverage communicates with a UE outside network coverage, the two UEs may use incompatible power and rate control rules leading to low communication rates and high interference between cellular and adhoc UEs.

WO 02/003567 A3 discloses a method for Adaptive Power Control for Wireless Networks. It generally aims at reducing mobile nodes' power consumption and achieving lower SINR. A distributed algorithm is disclosed for this purpose. However, the distributed algorithm is not optimal.

U.S. Pat. No. 7,899,483 B2 discloses a method and system for Performing Distributed Outer Loop Power Control in Wireless Communication Networks: This document discloses a method that iteratively adjusts the SINR targets in an ad-hoc network. in this method and system the main focus is on an architecture with one Receiving Node and Multiple Transmitter Nodes. However, this method is not optimal.

SUMMARY

It is therefore an object of embodiments herein to provide a way of improving the performance and robustness in D2D communication.

According to a first aspect of embodiments herein, the object is achieved by a method in a first wireless device for adjusting Signal-to-Interference-plus-Noise-Ratio, SINR, target and a transmit rate. The first wireless device is configured to transmit data to a second wireless device over a Device-to-Device, D2D, link. The first wireless device receives a report on a control channel from the second wireless device. The report comprises a measurement of SINR on said control channel and/or a data channel transmitted by the first device. The first wireless device adjusts a transmit power for the control channel and/or the data channel based on the reported measurement of the SINR on said control channel and/or data channel transmitted by the first device. The first wireless device then adjusts a SINR target and a transmit rate based on the adjusted transmit power. The SINR target and transmit rate are to be used when transmitting on the data channel over the D2D link to the second wireless device.

According to a second aspect of embodiments herein, the object is achieved by a first wireless device for adjusting Signal-to-Interference-plus-Noise-Ratio, SINR, target and a transmit rate. The first wireless device is configured to transmit data to a second wireless device over a Device-to-Device, D2D, link. The first wireless device comprises a receiving circuit configured to receive a report on a control channel from the second wireless device. The report comprises a measurement of SINR on said control channel and/or a data channel transmitted by the first device. The first wireless device comprises an adjusting circuit configured to adjust a transmit power for the control channel and/or the data based on the reported measurement of the SINR on said control channel and/or the data channel transmitted by the first device. The adjusting circuit further is configured to adjust a SINR target and a transmit rate based on the adjusted transmit power, which SINR target and transmit rate are to be used when transmitting on the data channel over the D2D link to the second wireless device.

Since the first wireless device receives a measurement of SINR on the control channel and/or the data channel, the first wireless device can adjust a transmit power for the control channel and/or the data channel, and based on the adjusted transmit power the first wireless device can adjust a SINR target and a transmit rate without assistance from the network. In this way the SINR target and a transmit rate can be set when the first and/or second device in the D2D pair are outside network coverage.

An advantage of embodiments herein is that it achieves close to optimal throughput without assuming network assistance or other central controller entity. In this way the performance and robustness in D2D communication has been improved.

BRIEF DESCRIPTION OF THE DRAWINGS

Examples of embodiments herein are described in more detail with reference to attached drawings in which.

DETAILED DESCRIPTION

Figure 1:
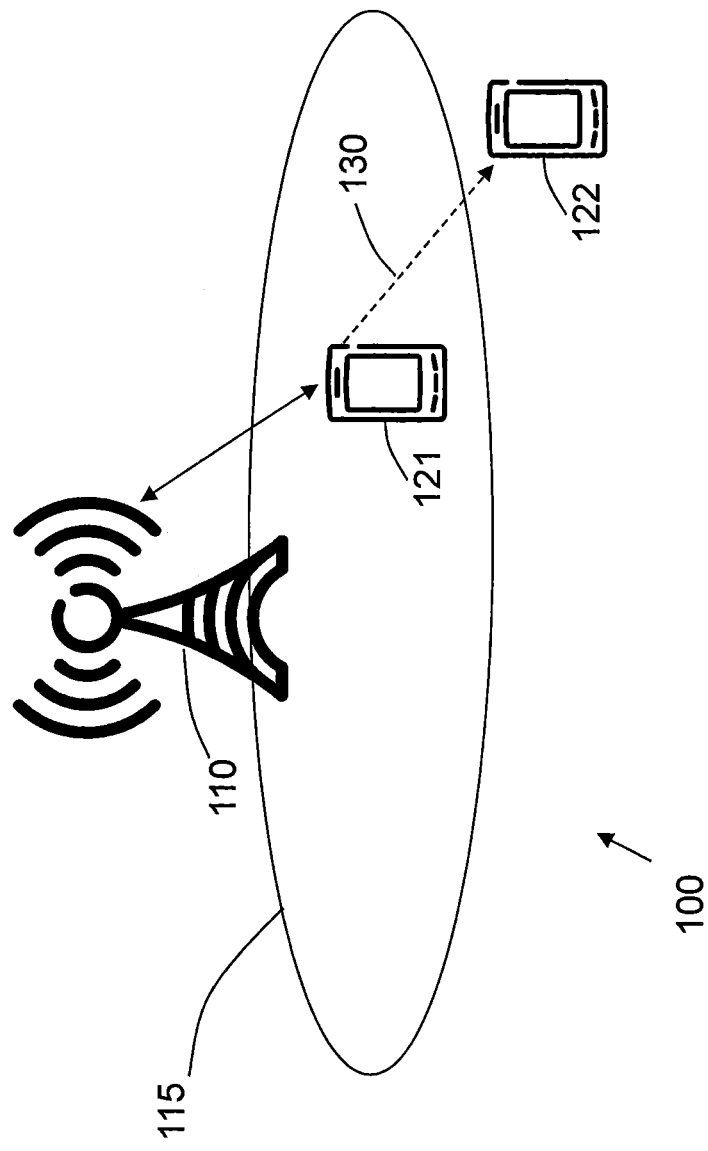
FIG. 1 is a schematic block diagram illustrating embodiments in a communications network.

FIG. 1 depicts a cellular communications network 100 in which embodiments herein may be implemented. The cellular communications network 100 is a wireless communication network such as an LTE, WCDMA, GSM network, any 3GPP cellular network, Wimax, or any cellular network or system.

The cellular communications network 100 comprises a plurality of network nodes whereof one, a network node 110 is depicted in FIG. 1. The network node 110 may be a radio base station such as e.g. an eNB, an eNodeB, or an Home Node B, an Home eNode B or any other network node capable to serve a user equipment or a machine type communication device in a cellular communications network. The network node 110 may further be a core network node, a Radio Access Network (RAN) node, or any other RAN access point, or an Operation and Maintenance node. The network node 110 may when being a base station serve a cell 115 which is one of cells comprised in the cellular communications network 100.

A number of user equipments are located in the cellular communications network 100. Any of these user equipments may have the role of being a transmitter device or a receiver device. These roles will be further discussed below. In the example scenario of FIG. 1, only two wireless devices are shown whereof one, a first wireless device 121 is located in the cell 115 of the cellular communications network 100 and one, a second wireless device 122 is out of the coverage of the cellular communications network 100. The first wireless device 121 has in this example scenario the role of a transmitter device which first wireless device 121 also may be referred to as a master device. The first wireless device 121 is configured to transmit beacon signals 130. The beacon signals are transmitted so that slave devices in the vicinity shall be able to hear the beacon signals to discover a master device for D2D communication.

The second wireless device 122 is located out of the coverage of the cellular communications network 100, but within a radio range of the first wireless device 121, so that it can hear radio signals such as beacon signals transmitted by the first wireless device 121. The second wireless device 122 in this example scenario has a the role of a receiver node which also may be referred to as a slave device. The second wireless device 122 may be configured to receive beacon signals from master devises in the vicinity. This means that the second wireless device 122 may receive i.e. listen for beacon signals transmitted by a master device such as e.g. the first wireless device 121, and other master devices (not shown) for discovering a master device that the second wireless device 122 can communicate with, using D2D communication.

The first wireless device 121 and the second wireless device 122 are capable of communicating with other master or slave devices in their respective vicinity using D2D communication. The first wireless device 121 and the second wireless device 122 may e.g. be mobile terminals or wireless terminals, mobile phones, computers such as e.g. laptops, Personal Digital Assistants (PDAs) or tablet computers, sometimes referred to as surf plates, with wireless capability, or any other radio network units capable to communicating over a radio link in a cellular communications network.

However, methods according to embodiments herein, are applicable to scenarios in which the first wireless device 121 and the second wireless device 122 both, only one of them or none of them, are covered by the cellular communications network 100.

Master and Slave Roles of Devices

According to some embodiments herein, when a wireless device broadcasts a beacon signal to allow other wireless devices to discover it, the wireless device sending the beacon may be referred to as a master device such as the first wireless device 121, and the wireless device receiving the beacon may be referred to as a slave device such as the second wireless device 122. Sending beacon signals by the first wireless device 121 being a master device allows the second wireless device 122 being a slave device to discover the first wireless device 121 for possible D2D communication. This is e.g. done in order to let the second wireless device 122 be aware that the first wireless device 121 can provide some service that may be interesting for the second wireless device 122. Note that in some embodiments a single node, for example a user handheld device such as a smart phone, may play the master and the slave roles simultaneously.

That is, based on the received power levels on the beacon signals, the receiver node, i.e. the second wireless device 122 may estimate the path loss or gain (G) towards a specific node that transmitted that beacon such as the first wireless device 121. This under the assumption that all nodes uses the known transmit power level for the beacons.

Configurations in the first and second wireless devices 121, 122 according to embodiments herein will be described later on.

Embodiments herein are facilitated by a novel and highly non-trivial SINR target and data transmission rate control, and a Foschini-Miljanic-Zander type of power control that is made capable of targeting adaptive, rather than fixed, as in the classical F-M-Z case SINR targets that builds upon the decomposition of the joint rate setting and transmit power control problems into separate sub-problems. It is shown that these decomposed sub-problems may be addressed by a few iterations between transmitter nodes such as the first wireless device 121 and receiver nodes such as the second wireless device 122 that require some signaling support. Embodiments herein are therefore the novel application of the control channel measurements to set data channel parameters, and a non-trivial algorithm facilitated by signaling support between the transmitter and receiver nodes.

Figure 2:
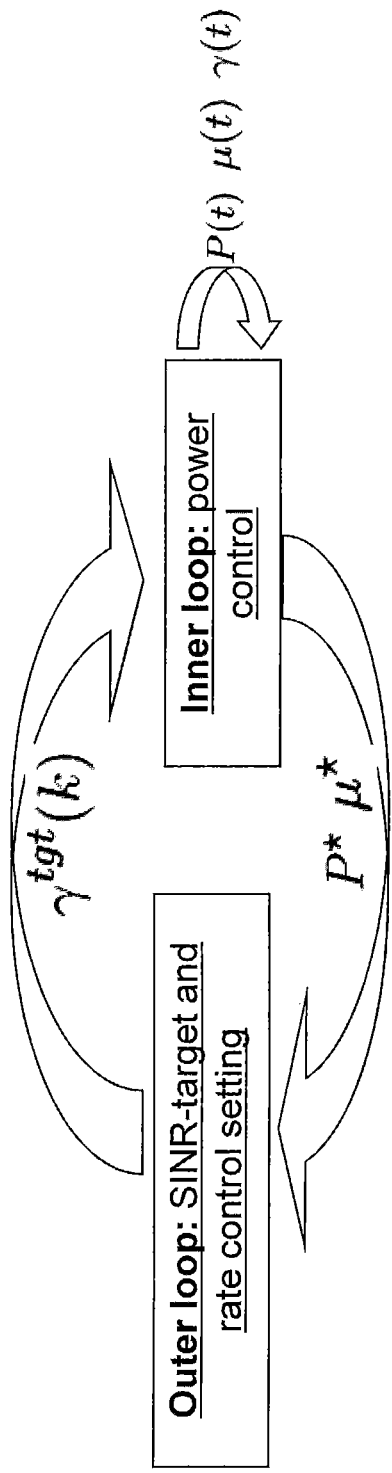
FIG. 2 is a schematic block diagram illustrating embodiments herein.

The algorithm described hereinafter is made up of an outer loop SINR target and data transmission rate adaptation scheme and inner loop power control mechanism that resembles the Foschini-Miljanic-Zander approach. A sketch example of the algorithm machinery according to embodiments herein is illustrated in FIG. 2.

Index (k) represents the outer loop iterations that govern the SINR target $\gamma^{tgt}(k)$ updates. Index (t) represents the inner loop iterations for the transmitting power updates for the particular SINR target valid during the k-th outer loop.

The outer loop cycles are indexed with (k), while the inner loop cycles with (t).

(1) At each step (k), the SINR target/rate control mechanism is in charge to set a specific SINR target $\gamma^{tgt}(k)$ that reflects a certain data transmission rate at the transmitter node such as the first wireless device 121. Such SINR target $\gamma^{tgt}(k)$ is the input of the inner loop power control.

(2) At each step (t), both the transmitter node such as the first wireless device 121 measure the actual SINR perceived, $\gamma(t)$ and the receiver node such as the second wireless device 122 measure the actual SINR perceived, $\gamma_c(t)$ respectively.

(3) The first wireless device 121 and the second wireless device 122 then exchange critical information such as e.g. the measured SINR, on the data channel and on the control channel respectively. On the data channel the Transmitter Node such as the first wireless device 121 sends data to the Receiver Node such as the second wireless device 122. This data can be real user data, or it can be just some dummy data in order to allow the Receiver Node to measure the SINR. Besides data, the first wireless device 121 may send in the data channel the SINR experienced in the control channel, and/or power control commands for the control channel and/or the transmitter SINR target. In the control channel, the second wireless device 122 may send Acknowledgement (ACK)/Negative Acknowledgement (NAK) information, Channel Quality Indicator (CQI) reports, and power control commands for the data channel, and/or a quantity $\gamma(k)$ (which will be explained below) used by the first device 121 to update the rate and/or the SINR measured on the data channel.

For the ease of notation, in the sequel it is only referred to the SINR perceived by the receiver node such as the SINR that second wireless device 122 perceives 122 on the data channel received from the first device 121 in the data or control channel, which SINR perceived by the receiver node is indicated with $\gamma(t)$.

(4) The SINRs perceived by the second wireless device 122, i.e. the receiver node is used to adjust at (t+1) the transmitting power P(t+1) at the transmitter node for the data channel in order to meet the required SINR target $\gamma^{tgt}(k)$ and the transmitting power $\mu(t+1)$ at the receiver node for the control channel. The SINRs perceived by the first wireless device 121, i.e. the transmitter node i.e. is used to adjust at (t+1) the transmitting power $\mu(t+1)$ at the receiver node, i.e. the second wireless device 122 for the control channel. Once $\gamma^{tgt}(k)-\delta \leq \gamma(t) \leq \gamma^{tgt}(k)+\delta$ (where $\delta$ represents a predetermined system constant) is satisfied, the inner loop power control terminates.

The output of the inner loop is the power P* at the transmitter and the power $\mu^*$ at the receiver. These two quantities are used to update the SINR target and the rate at the next outer loop iteration (t+1), as will be explained below.

Embodiments herein may be applied to both single-hop, i.e. star topology networks where each wireless devices is a single hop apart from the access point, and multi-hop scenarios. An advantage of the algorithm is that it may achieve close to optimal throughput without assuming network assistance or other central controller entity.

Embodiments of a Method Seen from the View of the First Device 121

Figure 3:
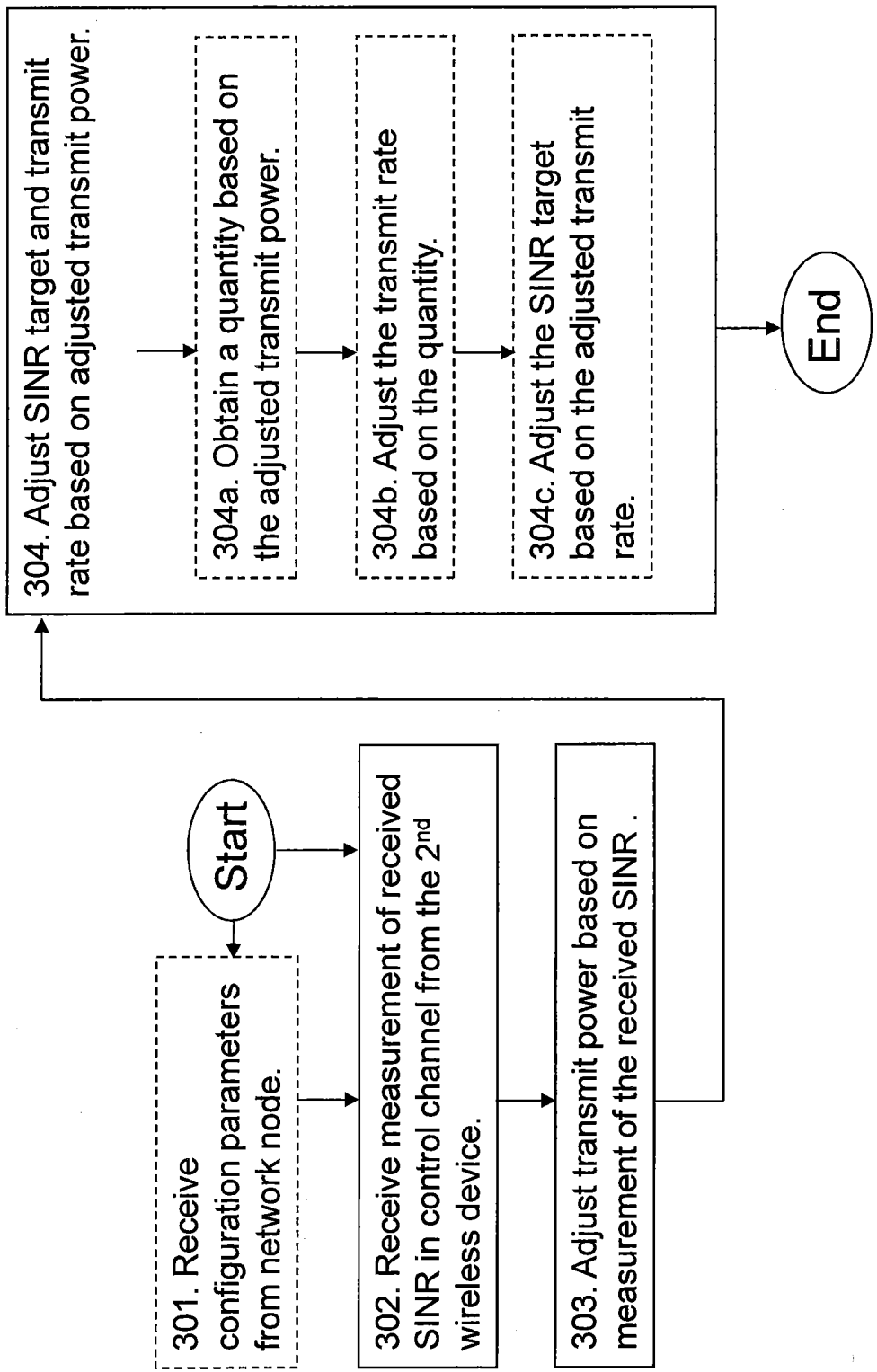
FIG. 3 is a flowchart depicting embodiments of a method in a first wireless device.

Example of embodiments of a method in the first wireless device 121 for adjusting SINR target and a transmit rate, will now be described with reference to a flowchart depicted in FIG. 3. In some embodiments, the first wireless device 121 is configured to transmit data to a second wireless device 122 over a D2D link. The first wireless device 121 and/or the second wireless device 122 may have no network connection, such as e.g. be out of coverage of the cellular communications network 100.

The method is described in a general way here together with FIG. 3, but will be described more in detail below. The method comprises the following actions, which actions may be taken in any suitable order. Dashed lines of some boxes in FIG. 3 indicate that this action is not mandatory.

Action 301

As a preparatory step, all nodes, i.e. all D2D transmitters such as the first wireless device 121 and receivers such as the second wireless device 122 may be configured to a common so called utility function by a node in the the cellular communications network 100 or connected thereto. The node may be the network node 110 such as a core network node, a Radio Access Network (RAN) node, e.g. an eNB such as the network node 110, or any other RAN access point, or an Operation and Maintenance node. Therefore in some embodiments, the first wireless device 121 receives one or more parameters such as e.g. a configuring parameter $\omega$ for a common utility function to be used for communication with the second wireless device 122 over the D2D link, which parameter $\omega$ is a parameter controlling an optimization objective. The parameter $\omega$ will be used as input in equation 6 below.

Action 302

The first wireless device 121 receives a report on a control channel from the second wireless device 122. The report comprises a measurement of SINR on said control channel and/or a data channel transmitted by the first device 121. I.e. the second wireless device 122 measures SINR on the control channel and/or the data channel that has been transmitted by the first device 121 to the second wireless device 122. The second wireless device 122 then reports the measured SINR to the first wireless device 121.

Figure 4:
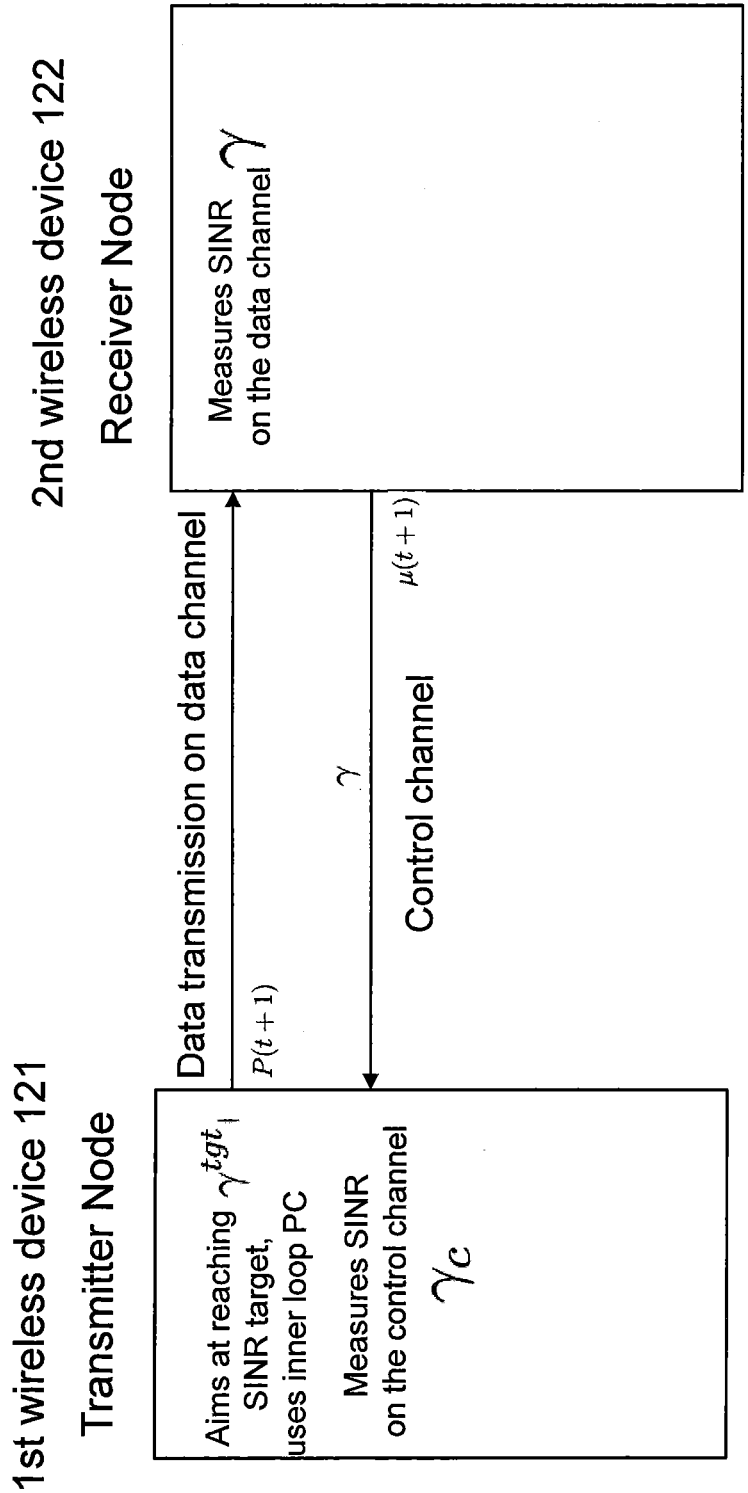
FIG. 4 is a schematic block diagram illustrating embodiments herein

The operation according to some embodiments is depicted in FIG. 4. The first wireless device 121 transmits data on the data channel to the second wireless device 122 and the second wireless device 122 measures the SINR on this data channel (using known techniques). The second wireless device 122 uses the control channel to report this measured SINR value back to the first wireless device 121. The control channel is not the "same" in both directions, on the contrary, it is very important that the two control channels in the two directions are orthogonal, that is they do not interfere with one another so that they can be used for the reporting. According to the embodiments depicted in FIG. 4:

The first wireless device 121 aims at reaching an SINR target at the second wireless device 122, which SINR target is $\gamma^{tgt}|$.

The second wireless device 122 perceives, i.e. measures an actual SINR on the data channel, which is $\gamma$.

The second wireless device 122 reports the measured SINR back to the first wireless device 121 on the control channel; uses transmit power level µ(t+1)

The first wireless device 121 uses the reported measured SINR to adjust, i.e. increase or decrease, its transmit power P so that the SINR target is reached.

As an alternative to this basic operation, the first wireless device 121 may also send control information to the second wireless device 122 and the second wireless device 122 may measure the SINR on this control channel, the algorithm works with this as well. This means that the inner loop algorithm achieves the SINR target on whatever channel if the second wireless device 122 consistently measures the received SINR at this channel, i.e. data channel or control channel, and the first wireless device 121 consistently adjusts the transmit power for this channel i.e. data channel or control channel.

Action 303

The first wireless device 121 then adjusts a transmit power for the control channel and/or the data channel based on the reported measurement of the SINR on said control channel and/or the data channel transmitted by the first device 121. Please see explanation above. From the algorithm's point of view there is only SINR measurement and transmit power, and it may be applied to whatever channel, as long as the second wireless device 122 and the first wireless device 121 are consistent in reporting and corresponding adjusting.

This action may be performed by increasing or decreasing the transmit power until the SINR measured by the second wireless device 122, reaches the SINR target or until reaching a maximum transmit power level.

Action 304

The first wireless device 121 then adjusts a SINR target and a transmit rate based on the adjusted transmit power. The SINR target and transmit rate are to be used when transmitting on the data channel over the D2D link to the second wireless device 122.

The data channel is used to transmit data and ultimately that is the purpose of the communication. Since the first wireless device 121 knows what power level it should use toward the second wireless device 122, it may use this power level at whatever channel to reach the SINR target. This is because the same path loss is assumed on both data and control channels.

This action of adjusting the SINR target and a transmit rate may e.g. be performed according to the following sub actions 304a-c.

Action 304a. The first wireless device 121 obtains a quantity based on the adjusted transmit power. The quantity is a function of the SINR target.

This may be performed by sending the adjusted transmit power to the second wireless device 122 and then receiving the quantity from the second wireless device 122. In this embodiment the quantity is calculated by the second wireless device 122 based on the adjusted transmit power.

As an alternative, the quantity may be obtained by estimating the quantity based on the adjusted transmit power. The estimation of the quantity may be performed by the first wireless device 121 utilizing that the second wireless device 122 can send both the measured SINR and also the transmit power p employed by the second wireless device 122 on the control channel, see the FIG. 4. Since the first wireless device 121 knows P* and the SINR target, $\gamma^{tgt}$ in (Eq. 6) below, the first wireless device 121 only needs µ*, that is the transmit power by the second wireless device 122 on its control channel, and estimate G, the path gain between the first wireless device 121 and the second wireless device 122 in order to calculate the quantity.

Alternatively, the quantity may be transmitted by the second wireless device 122 in the control channel. In this case, the second wireless device 122 knows µ* and the first wireless device 121 communicates the $\gamma^{tgt}(k)$ to the second wireless device 122. The second wireless device 122 needs to transmit on the control channel the power control commands in order to allow the first wireless device 121 to achieve P*, and estimate G, the path gain between the first wireless device 121 and the second wireless device 122, in order to calculate the quantity.

The quantity may be based on the adjusted transmit power according to.

$$\lambda(k)=f(\gamma^{tgt}(k),P^*)g(\omega,\mu^*,G,\sigma,\gamma) \quad \text{(Eq. 6)}$$

where $\lambda(k)$ is the quantity,
$\gamma^{tgt}(k)$ is the SINR target at the second wireless device 122 at a step k,
P* is the transmit power adjusted by the first wireless device 121,
µ* is a transmit power adjusted by the second wireless device 122,
ω is a parameter controlling an optimization objective,
σ is a thermal noise, and
G is a channel gain.
f(.) and g(.) are two different functions that are preconfigured to account for the above parameters
Please note that the equations 1-5 will be described below and equation 6-8 will be further described below.

Action 304b. The first wireless device 121 adjusts the transmit rate based on the quantity. The transmit rate may be adjusted based on the quantity according to:

$$s(k+1)=h(s(k)m\epsilon,u(s(k)),\lambda(k)) \quad \text{(Eq. 7)}$$

where s(k+1) is the adjusted transmit rate after step (k),
s(k) is a transmit rate at a step (k),
ϵ is a predefined system constant set during a configuration setup,
u is a derivative of a utility function u(.), and
h(.) is a preconfigured function of the above parameters.

Action 304c. The first wireless device 121 then adjusts the SINR target based on the adjusted transmit rate. The SINR target may be adjusted based on the adjusted transmit rate according to.

$$\gamma^{tgt}(k+1) = 2^{\frac{s(k+1)}{w}} - 1 \quad \text{(Eq. 8)}$$

where $\gamma^{tgt}$ k+1 is the adjusted SINR target at step k+1, and
w is the channel bandwidth in Hz.

The following examples are applicable to any of the embodiments above.

Configuring a Common Objective Function Known by all Transmitters and Receivers in the System.

This relates to Action 301 described above. In a preparatory phase, all wireless devices, i.e. all D2D transmitters such as the first wireless device 121 and D2D receivers such as the second wireless device 122 may be configured with a common so called utility function by a node in the cellular communications network 100. The node may be a core network node, a Radio Access Network (RAN) node, e.g. an eNB such as the network node 110, or any other RAN access point, or an Operation and Maintenance node. This utility function may for example be associated with parameters such as the ω parameter mentioned above, for example any of the following parameters and sub-functions:

ω: The omega parameter is configured e.g. in the first wireless device 121 and the second wireless device 122 to be a strictly positive number, typically between 0.1 and 100. A large omega parameter implies large weight referred to as punishment, for using high transmit power values at the transmitters, whereas small omega values tend to encourage transmitters to use high transmit power levels.

Large weight for using high transmit power, that is large omega means that the value of the utility function that the device tries to maximize will decrease with a high value if the used transmit power level increases. In contrast, a small weight that is a small omega value means that the value of the utility function will decrease by only a small value when the used transmit power levels increase. Therefore "punishment" means the decrease of the utility function, since the system, i.e. each wireless device, tries to maximize the value of the utility function. Therefore, encouragement by small omega values means that the wireless devices will use high power levels to increase the achieved transmission rates even if it requires high transmit power levels, since the decrease of the utility function, that is the punishment in terms of utility function value, will be small, since the omega, the weight of the used power level in the utility calculation, is small.

u(.): The u(.) utility function may be preconfigured in each wireless node such as the first wireless device 121 and the second wireless device 122, such that each wireless node is capable of measuring the so called utility of achieving a certain transmission rate at a transmitter-receiver link such that the transmitter-receiver link 130 between the first wireless device 121 and the second wireless device 122 in FIG. 1. Each transmitter node such as the first wireless device 121 will then try to maximize its achieved utility function decreased by its weighted used transmit power level, where the weight is the above omega parameter. This utility function may be referred to as a sub function of the utility function mentioned above. It is derived from the global utility function so that each node pair may use a local utility function. Therefore it may be referred to as a sub function.

c(.) The c(.) capacity function may be preconfigured in each wireless node such as the first wireless device 121 and the second wireless device 122 to measure the achievable maximum rate between the transmitter node such as the first wireless device 121 and its receiver node such as the second wireless device 122 as a function of the own used transmit power and the experienced, i.e. measured interference level at the own receiver. The "own receiver" is the Receiver Node, i.e. the second Wireless Device 122. Each Transmitter Node has a specific Receiver Node with which it wants to communicate. This Receiver Node may be referred to as "own receiver device" to distinguish it from all other Receiver Nodes that do not want to receive data from this Transmitter Node and in fact perceive the transmitter node's signal as interference. This capacity function captures the dependence of the achievable data transmission rate at the particular transmitter-receiver link 130 such as the experienced SINR at the receiver node. This experienced SINR is, in turn, dependent on the transmit power levels of all other wireless nodes and the geometry of a mixed adhoc-cellular system e.g. comprising the cellular communications network 100.

Formally, the letter "s" is used to denote the achieved transmit data rate between a transmitter-receiver pair such as the first wireless device 121 and the second wireless device 122. The letter "p" is used to denote the used transmit power by a wireless transmitter node such as the first wireless device 121. The letter "l" denotes the l-th transmitter-receiver pair in the system, which is casually referred to as "link l". Accordingly, a subject matter of embodiments herein is to provide control mechanism for the data transmission rate (s) and power (p) at each transmitter node such as the first wireless device.

With the above preconfigured parameter omega and system functions u(.) and c(.) and using the above notation of rate (s) and power (p) on each transmitter-receiver pair (link l) embodiments herein may be described by an iterative method that sets SINR targets and transmit power levels for wireless devices such as the first wireless device 121 and the second wireless device 122 that are outside NW coverage. This iterative method is based on a distributed optimization technique that operates on a system level utility function that is capable of taking into account the achieved data transmission rates, or more precisely a defined utility of the individual achieved rates s_l, in all links as well as the used transmit power levels according to the following:

$$\text{Sum Utility of Rate } s_l \text{ and Used Power } P_l \text{ over All Links } l \triangleq \sum_l u_l(s_l) - \omega \sum_l P_l \quad \text{(Eq. 1)}$$

The objective of Eq. 1 is to maximize the sum of the utility functions u(.) over each transmitter-receiver link l, while minimizing the overall sum of transmitting power Sum P. The value of the utility function u(.) at link-l depends on the transmitting rate s and may be designed to reflect for instance some fairness criterion, see e.g. G. J. Foschini, Z. Miljanic. "A simple distributed autonomous power control algorithm and its convergence", *IEEE Trans. on Vehicular Technology*, November 1993. The parameter ω is a tuneable system constant, see above, and trades the power needed to maximize the utility. The constraints in Eq. (1) above state that for a given transmitter-receiver pair l, the transmitting rate cannot exceed the capacity c of the transmitter-receiver link that in turn depends on the transmit power (p) and interference/path loss variations of the data and control channels. In the sequel, we neglect the index l of the transmitter-receiver links since all the links in the cellular communications network 100 need to run the same embodiments independently. For ease of notation, the SINR experienced, i.e. measured by a Receiver node such as the second wireless device 122 is indicated with γ and the SINR target that a specific transmitter node such as the first wireless device 121 tries to achieve is indicated with $\gamma^{tgt}$ respectively.

Figure 5:
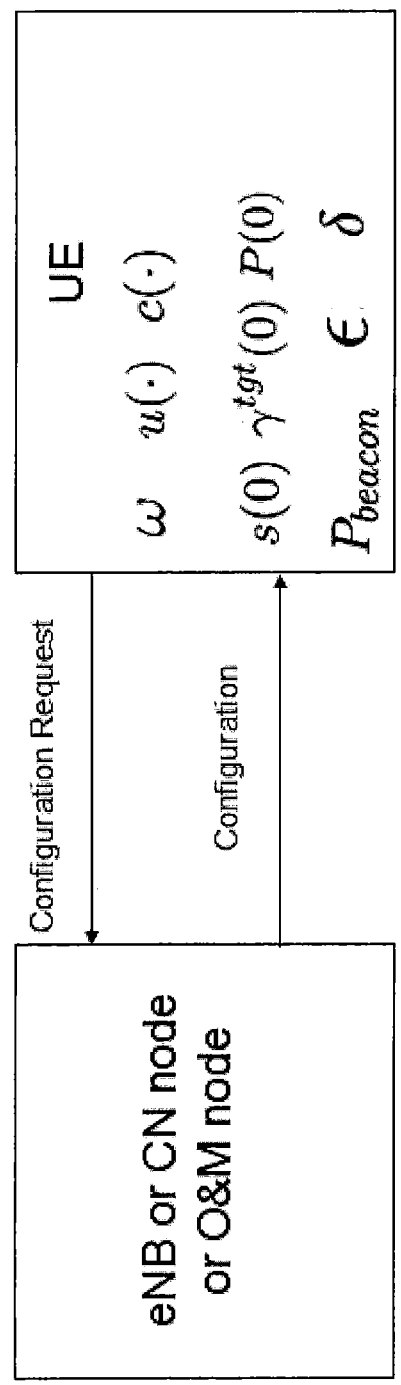
FIG. 5 is a schematic block diagram illustrating embodiments herein.

In FIG. 5, the setup of the algorithm is illustrated, i.e. an initial configuration of key parameters at the respective wireless device such as the first wireless device 121 and the second wireless device 122, by some central entity, such the eNB, the core network node or the O&M node.

The beacon transmit power $P_{beacon}$ which is mentioned in FIG. 5 is important for the wireless devices to be able to calculate the path gain between the Transmitter Node and Receiver Node such as between the first wireless device 121 and the second wireless device 122. This G value is needed in the outer-inner loops and therefore the beacon transmit power must be preconfigured in the preparatory phase. See explanation above at the end of the first paragraph in Chapter "Master and Slave Roles of Devices".

Figure 6:
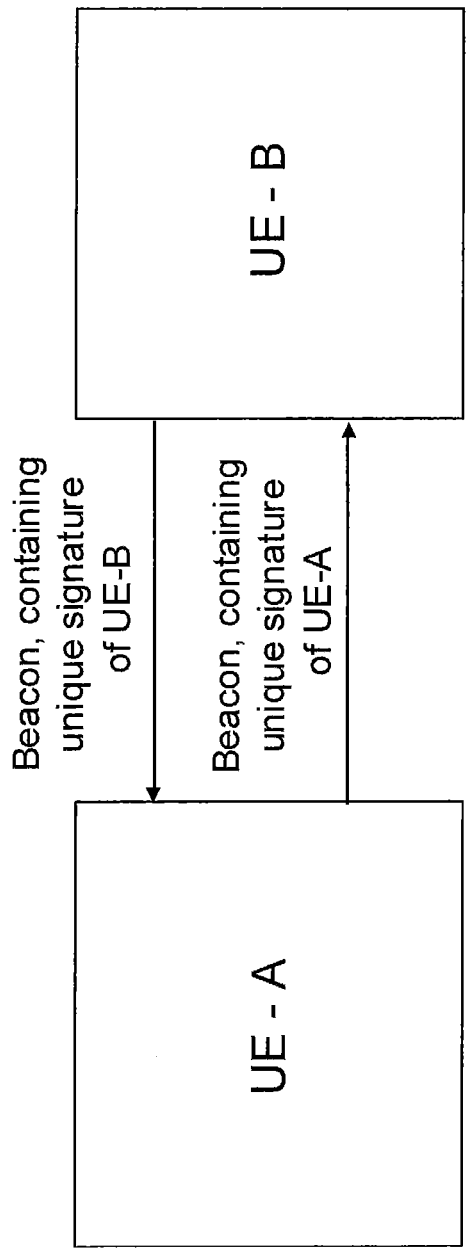
FIG. 6 is a schematic block diagram illustrating embodiments herein.

The initial configuration is part of the registration procedure that every wireless device such as the first wireless device 121 and the second wireless device 122, that wants to be part of the system may perform. s(0) and $\gamma^{tgt}(0)$ are the initial transmit rate and initial SINR target that every node in the system start using upon starting the execution of the algorithm of embodiments herein. It is further assumed that the first wireless device 121 has learned the system bandwidth W, e.g. from System Information Block (SIB) broadcast messages, as known by the skilled person or by preconfiguration as described in 3GPP TR 22.803 Section 4.2 of 3GPP TR 22.803, where it reads:

If network coverage is not available, the control path can exist directly between Public Safety UEs, as shown with the solid arrow in FIG. 6. In this configuration, the Public Safety UEs can rely on pre-configured radio resources to establish and maintain the Proximity-based Services (ProSe) Communication.

A Configuration Request may for instance be mapped into a RRCConnectionRequest message, comprising as EstablishmentCause a request for NSPS support. A Configuration setup from RAN/CN comprising the algorithm setup may be for instance mapped into the RRCConnectionSetup message. Then in these Configuration Request and Configuration Setup RRC messages the information elements shall be defined and those will be the ones that are needed to configure the common objective function.

Preparation: Each Transmitter-Receiver Pair Establishes an Estimate of the Path Gain of the Channel Between them (G)

Establishing the Path Loss Table (PLT)

FIG. 6: During initialization, UEs such as the first wireless device 121 and the second wireless device 122 send out beacon signals comprising a unique signature, code, and a predefined transmit power, see $P_{beacon}$ in the previous figure. In FIG. 6, the first wireless device is referred to as UE-B and the second wireless device 122 is referred to as UE-A.

According to some embodiments herein, during initialization and whenever the first wireless device 121 is not involved in D2D communications, it continuously broadcasts a beacon signal that comprises a unique signature of the first wireless device 121. Also, every node such as the second wireless device 122 continuously measures on received beacon signals and attempt to decode such beacons. Since every node uses the same beacon signal transmit power, preconfigured, as in the previous figure, every node such as the second wireless device 122 may maintain a path loss table where all nodes whose beacon signals are decodable are listed with associated path loss (G) values. In the example of FIG. 5, UE-B broadcasts its unique signature, whose creation is out of the scope of the invention but well known to the skilled person, and UE-A detects, decodes and computes the path loss towards UE-B. It is easy to see that UE-B can measure and compute the similar path loss with respect to UE-A.

The table where first wireless device 121, i.e. UE-B maintains the detected wireless devices with associated path loss values is called the Path Loss Table (PLT) and may be different in every wireless device according to the system dynamics, interference levels, mobility, receiver sensitivity, etc. The pathloss table may be used by the first wireless device 121 for closed loop power control to achieve a given SINR target at its receiver node, the second wireless device 122 below.

Figure 7:
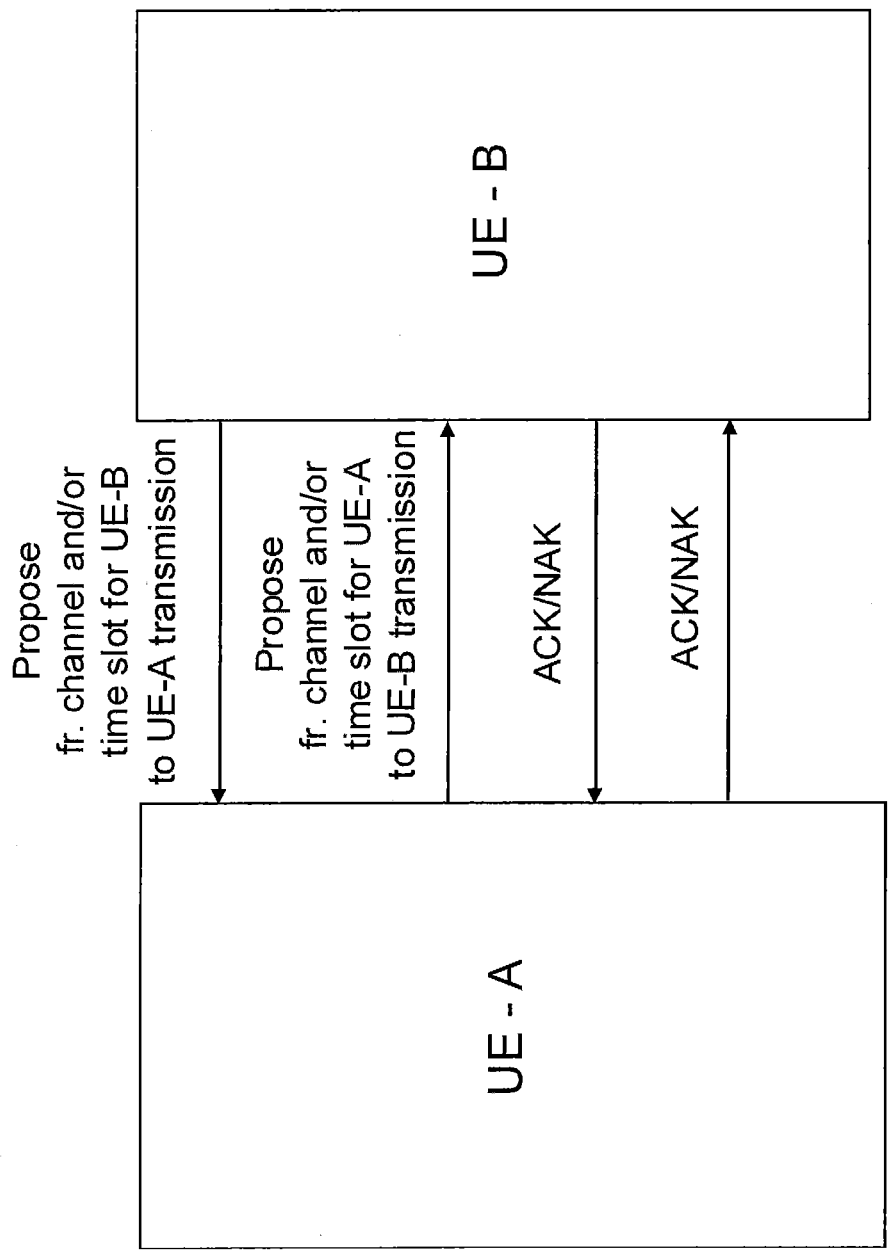
FIG. 7 is a schematic block diagram illustrating embodiments herein.

Orthogonalization within the Wireless Device Pair 121, 122 for Bidirectional Communications FIG. 7: During initialization, wireless devices such as the first wireless device 121 perform orthogonalization based on a simple distributed negotiation with an ACK/(NAK signaling mechanism.

As a preparation phase, the first wireless device 121 referred to as UE-B in FIG. 7 and the second wireless device 122 referred to as UE-A in FIG. 7 perform a so called orthogonalization, by means of which transmissions from the first wireless device 121 to the second wireless device 122 and transmissions from the second wireless device 122 to the first wireless device 121 do not interfere with each other.

This may be achieved by a sub-channelization of the UL/DL bandwidth so that the first wireless device 121 and the second wireless device 122 transmit on mutually non-interfering parts of the bandwidth. Alternatively, the first wireless device 121 and the second wireless device 122 share the same bandwidth on a Time Division Duplex (TDD) mode. As a consequence, the two power control loops between the first wireless device 121 and the second wireless device 122 and between the second wireless device 122 and the first wireless device 121 described later are executed on different part of the spectrum if Frequency Division Duplex (FDD) is applied or on a different time domain f TDD is applied.

Orthogonalization, according to embodiments herein is achieved in a fully autonomous and distributed way as described in FIG. 6. Orthogonalization takes place between two wireless devices that are in the process of establishing a communication link between each other. It may be performed according to the following, as described from the perspective of the second wireless device 122 (the first wireless device 121 behaves symmetrically:

The second wireless device 122 randomly selects a time interval TI and starts its timer when it receives a beacon signal from the first wireless device 121. When the time interval elapses and it has not received any so called "Orthogonalization Proposal" (OP) from the first wireless device 121, it transmits its own OP to the first wireless device 121.

The second wireless device 122 waits for an ACK OP signal from the first wireless device 121. If it does not receive such a signal from the first wireless device 121, it returns to 1.

If the second wireless device 122 receives an OP from the first wireless device 121, it analyzes the content and sends back an OP ACK signal to the first wireless device 121 unless the orthogonalization scheme proposed by the first wireless device 121 is unacceptable, for example if the second wireless device 122 does not have the specific capabilities required to support the proposed orthogonalization scheme. In such case, the second wireless device 122 sends a NAK signal back to the first wireless device 121 in order to notify the first wireless device 121 that the OP was not accepted by the second wireless device 122.

It is worth mentioning, that the orthogonalization procedure described in this section may advantageously be implemented in a NSPS network, regardless of whether or not nodes support the algorithm according to embodiments herein. The orthogonalization is used in order to support the algorithm, since the control channel and the data channel should not interfere each other. Otherwise the algorithm will be less successful.

The second wireless device 122 feeds back the actual measured SINR value to the first wireless device 121.

Each Transmitter Node Such as the First Wireless Device 121 Employs Closed Loop Power Control to Achieve a Given SINR Target at its Receiver Node Such as the Second Wireless Device 122.

Each transmitter such as the first wireless device 121 assumes a given SINR target at its receiver, i.e. the second wireless device 122. Initially, this SINR target may be some preconfigured, often low, SINR value, such as 1 dB, see $\gamma^{tgt}(0)$ in FIG. 4. Each transmitter knows the path loss to its own receiver, e.g. the first wireless device 121 knows the path loss to the second wireless device 122, due to the Path Loss Table as described in above.

As mentioned above, the first wireless device 121, i.e. transmitter node has one receiver node, the second device 122 associated with it that it wants to send data to. This may be referred to as "Own Receiver". Please note that this has nothing to do with the transmitter and receiver circuitry that is physically part of the Transmitter Node.

Thus, by looking in its Path Loss Table, the first wireless device 121 finds the pathloss to the second wireless device 122.

Since the first wireless device 121 knows the path loss to the second wireless device 122 and the initial SINR target, it determines its initial transmit power level P by state of the art method such as by simply calculating the necessary transmit power by using the SINR target as a signal-to-noise ratio target and the known path loss value or by using the Foschini-Miljanic-Zander algorithm known by the skilled in the art, and initially assumes close to zero interference, that is assuming that the target SINR may be reached by considering the target SINR as a target SNR value.

Since other wireless devices such as the second wireless device 122 follow the same procedure in parallel, the actual experienced, i.e. measured SINR at the receiving second wireless device 122 will be different, lower than the targeted SINR value, since the real interference at the receiver nodes will be greater than zero. Therefore, the second wireless device 122 feeds back the actual measured SINR value to the first wireless device 121 to adjust the transmit power. This relates to Action 302 described above. The first wireless device 121 keeps increasing its transmit power until the actual experienced SINR at the second wireless device 122 (initial) reaches the SINR target or some maximum transmit power level. Initially this target SINR value is $\gamma^{tgt}(0)$ as of FIG. 4. The above procedure is repeated at any cycle (k) of the outer loop updates, where the SINR target $\gamma^{tgt}(k)$ is given as an input to the inner loop power control as previously illustrated in FIG. 2.

Figure 8:
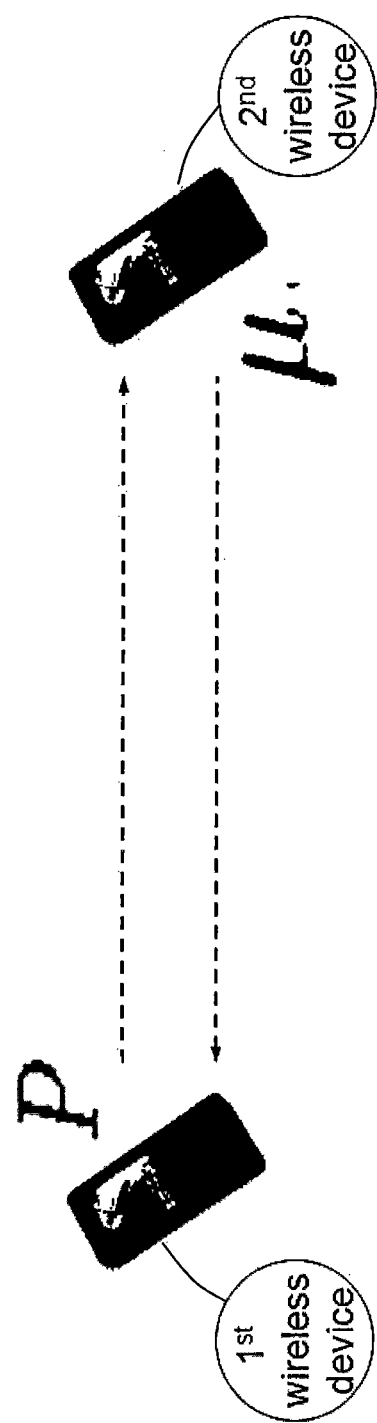
FIG. 8 is a schematic block diagram illustrating embodiments herein.

This procedure is illustrated in FIG. 8. In this arrangement, first wireless device 121 is the D2D transmitter, at some iteration (t) transmitting with power P(t)) and the second wireless device 122 is the actual D2D receiver, employing transmit power $\mu(t)$ when sending back the control (measurement) commands to the first wireless device.

FIG. 8 depicts the closed loop power control. According to embodiments herein, the receiver node i.e. the second wireless device 122 reports measured SINR to the transmitter node, i.e. the first wireless device through a control channel. The transmit power used for this control channel is also carefully set by the second wireless device 122.

The first wireless device 121 uses a certain power P to transmit to the second wireless device 122 for instance on the legacy Physical Uplink Shared Channel (PUSCH) channel.

The second wireless device 122 uses a certain, e.g. initially low, power $\mu$ to transmit to the D2D-capable first wireless device 121 for instance on the legacy PUCCH Channel.

Formally, the first wireless device 121 assumes to know a SINR target, initially this target is $\gamma^{tgt}(0)$, successively it is referred to as $\gamma^{tgt}(k)$, and uses the following formula to update its transmit power P until the by the second wireless device 122 measured and reported SINR, —$\gamma(t)$ below—becomes equal to SINR target $\gamma^{tgt}(k)$:

$$P_{TX}(t+1)=\gamma^{tgt}(k)-\gamma(t)+P_{TX}(t) \text{ [dBm]} \quad \text{(Eq. 2)}$$

This relates to Action 303 described above.

The new power P (t+1) at iteration step (t+1) is computed by the D2D-capable first wireless device 121, upon receiving the reported the SINR $\gamma(t)$ at step (t).

The SINR target $\gamma^{tgt}(k)$ is fixed within the closed loop power control routine, and it is selected on top of closed loop power control routine as described in FIG. 2. Equation (2) may then be appropriately mapped on Transmit Power Control (TPC) commands and sent from the second wireless device 122 to the first wireless device in the next transmission.

According to some embodiments, the second wireless device 122 performs the following actions:

Measures the SINR $\gamma(t)$ at iteration (t)

Calculates Eq. (2) and sends TCP commands to the first wireless device 121 to meet the transmission power P(t+1) at the first wireless device 121 at iteration (t+1). This is an alternative when the second wireless device 122 calculates the transmit power that should be used by the first wireless device 121 and then the second wireless device 122 sends this to the first wireless device 121.

Stores the current P(t) that will be used in the next iteration (see Eq. 2).

Analogously, a similar expression may be applied for the power control routine from the D2D-capable second wireless device 122 to the D2D-capable first wireless device 121 (see also FIG. 6)):

$$\mu_{TX}(t+1)=\gamma^{tgt}(k)-\gamma_c(t)+\mu_{TX}(t) \text{ [dBm]} \quad \text{(Eq. 3)}$$

The new power $\mu(t+1)$ at iteration step (t+1) is computed by D2D-capable first wireless device 121, upon estimating the SINR $\gamma_c(t)$ at step (t).

The SINR target $\gamma^{tgt}(k)$ is fixed within the closed loop power control routine, and it may be assumed to be the same as the one for D2D-capable first wireless device 121 because of the proximity and hence channel reciprocity between the first wireless device 121 and the second wireless device 122. Equation (3) may be then appropriately mapped on TPC commands and sent from the D2D-capable first wireless device 121 to D2D-capable second wireless device 122 in a next transmission.

The closed loop power control mechanism stops whenever the SINR target $\gamma(t)$ of the D2D capable first wireless device 121 satisfies the following expression.

$$\gamma^{tgt}(k)-\delta \leq \gamma(t) \leq \gamma^{tgt}(k)+\delta \text{ [dBm]}$$

Alternatively, the power control stops after a certain number of closed loop iterations. The power achieved when the closed power control routine is stopped is denoted with P* at the first wireless device 121 and $\mu^*$ at the second wireless device 122.

Figure 9:
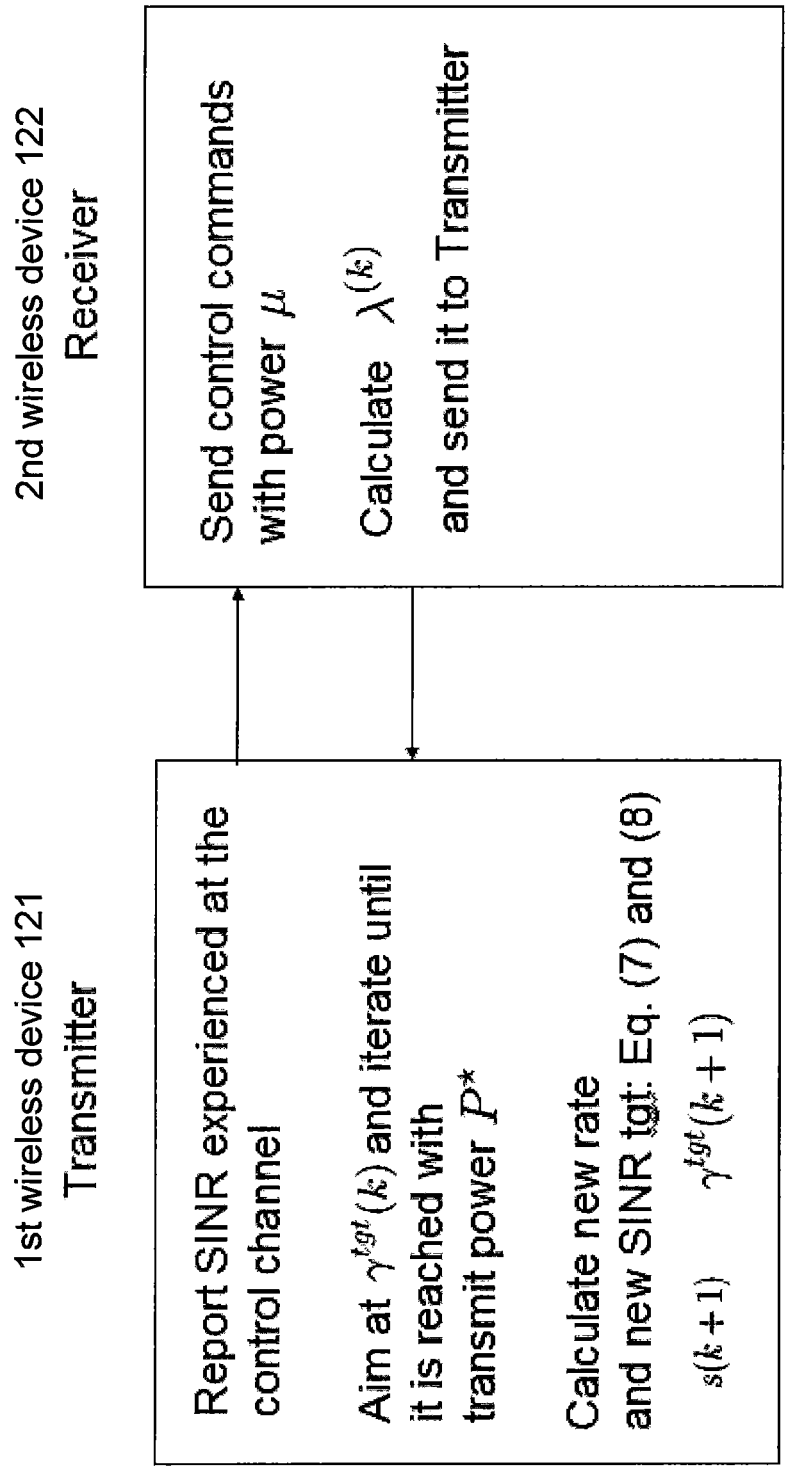
FIG. 9 is a schematic block diagram illustrating embodiments herein.

To summarize, the first wireless device 121 is transmitting to its receiver node, the second wireless device 122 with a power level such that the SINR at the second wireless device 122 is close to the desired target, which is initially $\gamma^{tgt}(0)$ and successively set to $\gamma^{tgt}(k)$ as described above. At this point, the transmitter-receiver pair is aware of the current value of the following variables that are maintained within each wireless device including the first wireless device 121 and the second wireless device 122, see below:

UE Internal Status of Variables Maintained During the Iterations $\gamma^{tgt}(k)$: SINR target at the receiver node during the Iteration-k P*: Transmit power level of the transmitter to reach the current SINR target $\omega$: Parameter controlling the optimization objective, see Eq. (1) and FIG. 3.

μ*: Transmit power level of the receiver to reach the current SINR target at the transmitter G: Path loss between the transmitter and receiver nodes as stored in the the Path Loss Table of the Transmitter σ: Thermal noise at the receiver An SINR Target Setting, Also Referred to as Rate Adaptation Mechanism This relates to Action 304 described above. Each transmitter such as the D2D capable first wireless device 121 computes the following quantity using the internal variables that each UE maintains, as illustrated in FIG. 9.

From Eq. (1), it is possible to derive the following quantity γ(k) at the end of the power control routine as follows:

$$\lambda(k) = f(\gamma^{tgt}(k), P^*) g(\omega, \mu^*, G, \sigma, \gamma) \quad \text{(Eq. 6)}$$

where σ is the thermal noise, and G is the channel gain between the transmitter-receiver pair, such as e.g. between the first wireless device 121 and the second wireless device 122.

With Eq. (6), the new rate s at step (k+1) may be computed as follows according to a gradient-like algorithm. Note that initially, at iteration 0, the initial rate s(0) was configured in each wireless device including the first wireless device 121 and the second wireless device 122 as illustrated in FIG. 4. The following equation (7) describes how the transmission rate at each transmitter is updated, i.e. that is how the first wireless device 121 may calculate s(k+1) from s(k) by means of λ(k):

$$s(k+1) = h(s(k) m\epsilon, u(s(k)), \lambda(k)) \quad \text{(Eq. 7)}$$

Where ε is a predefined system constant set during the configuration setup, see FIG. 4, and u' is the derivative of the utility function u(.) selected in Eq. (1).

The calculation of the new rate, i.e. the adjusted transmit rate at step (k+1) serves as an indication to the modulation and coding scheme (MCS) computation, and to the new, i.e. adjusted SINR target:

$$\gamma^{tgt}(k+1) = 2^{\frac{s(k+1)}{w}} - 1 \quad \text{(Eq. 8)}$$

wherein w is the channel bandwidth in Hz

The adjusted SINR target in Eq. (8) is then used as a new SINR target by the next closed loop power control routine described in Step 2.

In FIG. 9 illustrates a summary of the Transmitter, i.e. the first wireless device 121 and the Receiver, i.e. the second wireless device 122 behavior during the k-th iteration when the first wireless device 121 and the second wireless device 122 aim at updating their SINR targets, which in turn triggers the calculation of the new transmit power levels.

Application of the Joint Power Control and Rate Control in the Scenario of Partial Network Coverage The power control and MCS selection mechanism of embodiments herein may be advantageously employed in situations of partial network coverage as illustrated in FIG. 1. In such situations, wireless devices under network coverage such as e.g. the first wireless device 121 maintain standard control signaling with the base station such as the network node 110 and execute the SINR target setting, outer loop, and transmit power setting, inner loop, towards peer wireless devices such as the second wireless device 122 according to embodiments herein. The wireless devices covered by the cellular communications network 100 such as the first wireless device 121 continuously report a Power Headroom (PHR) to the network node 110 using standard procedures to indicate its available power as it continuously executes its D2D power control.

PHR is the transmit power that the first wireless device 121 may use for the cellular communication, that is to send data to the cellular network node 110 taking into account that power level that it uses for sending data to its peer D2D device, the second wireless device 122 which is the device it communicates with. The PHR may be thought of as the remaining power that the first wireless device 121 may use for cellular communication when some of its total power is used for the D2D communication with the second wireless device 122.

On the other hand, wireless devices outside the cellular communications network 100 coverage such as the second wireless device 122 may use their entire power budget for D2D communication and need not report PHR to a serving base station.

According to embodiments herein, a Radio Resource Management (RRM) technique that is tailored for D2D-based NSPS networks is provided.

The method according to embodiments herein is completely distributed in the sense that no centralized controller such as e.g. base station or eNB is required. The algorithm mechanism according to embodiments herein only requires quantities locally available at the transmitter-receiver pair and no message exchange between neighboring transmitters requires to be devised. There is a message exchange between a Transmitter node and Receiver node in both directions. Within a D2D pair both wireless devices can act as a Transmitter node and a Receiver node, and it is so that they exchange e.g. measured SINR values back and forth so that the SINR target setting and the power setting can work. However, there is no need for communication between a Transmitter of D2D Pair-1, and the Transmitter of D2D Pair-2. That is, there is no other communication than what is going on between the 2 wireless devises of the given D2D pair. In fact, the D2D pair does not even have to know whether there are other D2D pairs or only cellular traffic, the wireless devices of the D2D pair only need to measure the interference level at their own position without needing to identify where that interference comes from. So in that sense there is no need for message exchange between neighboring transmitters.

Compared with other off-the-shelf alternatives, the embodiments herein introduces a novel scheme in which a power control mechanism and rate adaptation work together in order to maximize a certain utility function that balances between spectral and energy efficiency, see Eq. 1. A further merit of embodiments herein, that distinguishes such approach from other alternatives is that the SINR targets that are progressively set during the algorithm machinery are always feasible, i.e. a closed power control loop may always find a finite power that fulfills the SINR target requirements.

Figure 10:
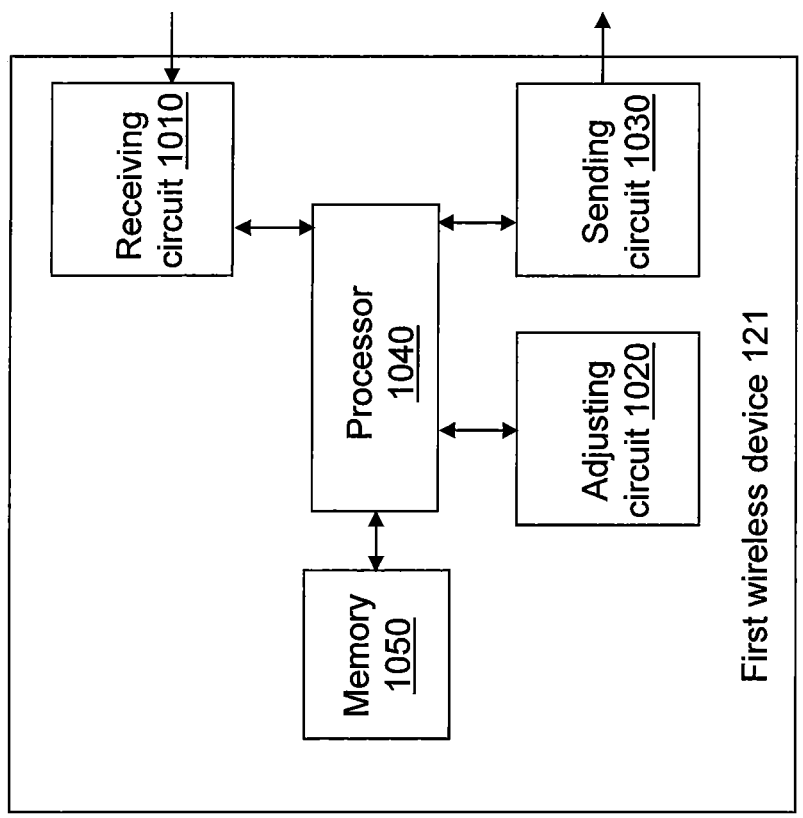
FIG. 10 is a schematic block diagram illustrating embodiments of a first wireless device.

To perform the method actions for adjusting SINR target and a transmit rate described above, the first wireless device 121, comprises the following arrangement depicted in FIG. 10. As mentioned above the first wireless device 121 is configured to transmit data to the second wireless device 122 over the D2D link 130. The first wireless device 121 and/or the second wireless device 122 may be arranged to have no network connection.

The first wireless device 121 comprises a receiving circuit 1010 configured to receive a report on a control channel from the second wireless device 122. The report comprises a measurement of SINR on said control channel and/or a data channel transmitted by the first device 121.

In some embodiments, the receiving circuit 1010 further is configured to receive from the network node 110 serving the first wireless device 121, a configuring parameter θ for a common utility function to be used for communication with the second wireless device 122 over the D2D link, which parameter ω is a parameter controlling an optimization objective The first wireless device 121 further comprises an adjusting circuit 1020 configured to adjust a transmit power for the control channel and/or the data based on the reported measurement of the SINR on said control channel and/or the data channel transmitted by the first device 121.

The adjusting circuit 1020 may further be configured to adjust the transmit power for the data channel by increasing or decreasing the transmit power until the SINR measured by the second wireless device 122, reaches the SINR target or until reaching a maximum transmit power level.

The adjusting circuit 1020 is further configured to adjust a SINR target and a transmit rate based on the adjusted transmit power, which SINR target and transmit rate are to be used when transmitting on the data channel over the D2D link to the second wireless device 122.

The adjusting circuit 1020 may further be configured to adjust the SINR target and a transmit rate by obtaining a quantity based on the adjusted transmit power, which quantity is a function of the SINR target, adjusting the transmit rate based on the quantity, and adjusting the SINR target based on the adjusted transmit rate.

In some embodiments the adjusting circuit 1020 further is configured to obtain the quantity based on the adjusted transmit power by sending the adjusted transmit power to the second wireless device 122 and receiving the quantity from the second wireless device 122, which quantity is calculated by the second wireless device 122 based on the adjusted transmit power.

The adjusting circuit 1020 may further be configured to obtain the quantity based on the adjusted transmit power by estimating the quantity based on the adjusted transmit power.

The quantity may be based on the adjusted transmit power according to $$\lambda(k)=f(\gamma^{tgt})(k),P^*)g(\omega,\mu^*,G,\sigma,\gamma) \quad \text{(Eq. 6)}$$

where $\lambda(k)$ is the quantity, $\gamma^{tgt}(k)$ is the SINR target at the second wireless device 122 at a step (k), P* is the transmit power adjusted by the first wireless device 121, μ* is a transmit power adjusted by the second wireless device 122, ω is a parameter controlling an optimization objective, σ is a thermal noise, G is a channel gain, and f(.) and g(.) are preconfigured functions of the above parameters.

The adjusted transmit rate may be based on the quantity according to.

$$s(k+1)=h(s(k),\epsilon,u(s(k)),\lambda(k)) \quad \text{(Eq. 7)}$$

where s(k+1) is the adjusted transmit rate after step (k), s(k) is a transmit rate at a step (k), ε is a predefined system constant set during a configuration setup, and u(.) is a preconfigured utility function, and h(.) is a preconfigured function of the above parameters.

The adjusted SINR target may be based on the adjusted transmit rate according to $$\gamma^{tgt}(k+1) = 2^{\frac{s(k+1)}{w}} - 1 \quad \text{(Eq. 8)}$$

where $\gamma^{tgt}(k+1)$ is the adjusted SINR target at step (k+1), and w is the channel bandwidth in Hz.

The adjusting circuit 1020 may further be configured to obtain the quantity based on the adjusted transmit power by a sending circuit 1030 configured to send the adjusted transmit power to the second wireless device 122, and by the receiving circuit 1010 further being configured to receive the quantity from the second wireless device 122, which quantity is calculated by the second wireless device 122 based on the adjusted transmit power.

The embodiments herein handling the process of adjusting SINR target and a transmit rate may be implemented through one or more processors, such as a processor 1040 in the first wireless device 121 depicted in FIG. 10, together with computer program code for performing the functions and actions of the embodiments herein. The program code mentioned above may also be provided as a computer program product, for instance in the form of a data carrier carrying computer program code for performing the embodiments herein when being loaded into the in the first wireless device 121. One such carrier may be in the form of a CD ROM disc. It is however feasible with other data carriers such as a memory stick. The computer program code may furthermore be provided as pure program code on a server and downloaded to the first wireless device 121.

The first wireless device 121 may further comprise a memory 1050 comprising one or more memory units. The memory 1050 is arranged to be used to store information and parameters obtained from the second user equipment 122 and/or the network node 110, adjustments, data, configurations, schedulings, and applications to perform the methods herein when being executed in the first wireless device 121.

Those skilled in the art will also appreciate that the receiving circuit 1010, the adjusting circuit 1020, the sending circuit 1030, described above may refer to a combination of analog and digital circuits, and/or one or more processors configured with software and/or firmware, e.g. stored in a memory, that when executed by the one or more processors such as the processor 1040 perform as described above. One or more of these processors, as well as the other digital hardware, may be included in a single application-specific integrated circuitry (ASIC), or several processors and various digital hardware may be distributed among several separate components, whether individually packaged or assembled into a system-on-a-chip (SoC).

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appending claims.

The invention claimed is:

1. A method in a first wireless device for adjusting a Signal-to-Interference-plus-Noise-Ratio, SINR, target and a transmit rate, which the first wireless device is configured to transmit data to a second wireless device over a Device-to-Device, D2D, link, the method comprising:

receiving a report on a control channel from the second wireless device, which report comprises a measurement of SINR on said control channel and/or a data channel transmitted by the first device, adjusting a transmit power for the control channel and/or the data channel based on the reported measurement of the SINR on said control channel and/or data channel transmitted by the first device, adjusting the SINR target and the transmit rate based on the adjusted transmit power, which the SINR target and the transmit rate are to be used when transmitting on the data channel over the D2D link to the second wireless device.

2. The method according to claim 1, wherein adjusting the SINR target and the transmit rate is performed by
obtaining a quantity based on the adjusted transmit power, which quantity is a function of the SINR target,
adjusting the transmit rate based on the quantity, and
adjusting the SINR target based on the adjusted transmit rate.

3. The method according to claim 2, wherein obtaining the quantity based on the adjusted transmit power is performed by sending the adjusted transmit power to the second wireless device and receiving the quantity from the second wireless device, which quantity is calculated by the second wireless device based on the adjusted transmit power.

4. The method according to claim 2, wherein obtaining the quantity based on the adjusted transmit power is performed by estimating the quantity based on the adjusted transmit power.

5. The method according to claim 2, wherein the quantity is based on the adjusted transmit power according to:

$$\lambda(k)=f(\gamma^{tgt}(k),P^*)g(\omega,\mu^*,G,\sigma,\gamma)$$

where $\lambda(k)$ is the quantity,
$\gamma^{tgt}(k)$ is the SINR target at the second wireless device at a step (k),
$P^*$ is the transmit power adjusted by the first wireless device,
$\mu^*$ is a transmit power adjusted by the second wireless device,
$\omega$ is a parameter controlling an optimization objective,
$\sigma$ is a thermal noise,
$G$ is a channel gain, and
$f(.)$ and $g(.)$ are preconfigured functions of the above parameters.

6. The method according to claim 5, wherein the adjusted transmit rate is based on the quantity according to:

$$s(k+1)=h(s(k),\epsilon,u(s(k)),\lambda(k))$$

where $s(k+1)$ is the adjusted transmit rate after step (k),
$s(k)$ is a transmit rate at a step (k),
$\epsilon$ is a predefined system constant set during a configuration setup, and
$u(.)$ is a preconfigured utility function, and
$h(.)$ is a preconfigured function of the above parameters.

7. The method according to claim 6, wherein the adjusted SINR target is based on the adjusted transmit rate according to:

$$\gamma^{tgt}(k+1)=2^{\frac{s(k+1)}{w}}-1$$

where $\gamma^{tgt}(k+1)$ is the adjusted SINR target at step (k+1), and
w is the channel bandwidth in Hz.

8. The method according to claim 1, further comprising:
receiving from a network node serving the first wireless device, a configuring parameter w for a common utility function to be used for communication with the second wireless device over the D2D link, which parameter $\omega$ is a parameter controlling an optimization objective.

9. The method according to claim 1, wherein the first wireless device and/or the second wireless device have no network connection.

10. The method according to claim 1, wherein adjusting the transmit power for the data channel is performed by increasing or decreasing the transmit power until the SINR measured by the second wireless device, reaches the SINR target or until reaching a maximum transmit power level.

11. A first wireless device for adjusting a Signal-to-Interference-plus-Noise-Ratio, SINR, target and a transmit rate, which the first wireless device is configured to transmit data to a second wireless device over a Device-to-Device, D2D, link, the first wireless device comprising:
a receiving circuit configured to receive a report on a control channel from the second wireless device, which report comprises a measurement of SINR on said control channel and/or a data channel transmitted by the first device,
an adjusting circuit configured to adjust a transmit power for the control channel and/or the data based on the reported measurement of the SINR on said control channel and/or the data channel transmitted by the first device, and
wherein the adjusting circuit further is configured to adjust the SINR target and the transmit rate based on the adjusted transmit power, which the SINR target and the transmit rate are to be used when transmitting on the data channel over the D2D link to the second wireless device.

12. The first wireless device according to claim 11, wherein the adjusting circuit further is configured to adjust the SINR target and the transmit rate by obtaining a quantity based on the adjusted transmit power, which quantity is a function of the SINR target, adjusting the transmit rate based on the quantity, and adjusting the SINR target based on the adjusted transmit rate.

13. The first wireless device according to claim 12, wherein the adjusting circuit further is configured to obtain the quantity based on the adjusted transmit power by a sending circuit configured to send the adjusted transmit power to the second wireless device and by the receiving circuit further configured to receive the quantity from the second wireless device, which quantity is calculated by the second wireless device based on the adjusted transmit power.

14. The first wireless device according to claim 12, wherein the adjusting circuit further is configured to obtain the quantity based on the adjusted transmit power by estimating the quantity based on the adjusted transmit power.

15. The first wireless device according to claim 12, wherein the quantity is based on the adjusted transmit power according to:

$$\lambda(k)=f(\gamma^{tgt}(k),P^*)g)\omega,\mu^*,G,\sigma,\gamma)$$

where $\lambda(k)$ is the quantity,
$\gamma^{tgt}(k)$ is the SINR target at the second wireless device at a step (k),
$P^*$ is the transmit power adjusted by the first wireless device,
$\mu^*$ is a transmit power adjusted by the second wireless device,
$\omega$ is a parameter controlling an optimization objective,
$\sigma$ is a thermal noise,
$G$ is a channel gain, and
$f(.)$ and $g(.)$ are preconfigured functions of the above parameters.

16. The first wireless device according to claim 15, wherein the adjusted transmit rate is based on the quantity according to:

$$s(k+1)=h(s(k),\epsilon,u(s(k)),\lambda(k))$$

where s(k+1) is the adjusted transmit rate after step (k), s(k) is a transmit rate at a step (k), $\epsilon$ is a predefined system constant set during a configuration setup, and u(.) is a preconfigured utility function, and h(.) is a preconfigured function of the above parameters.

17. The first wireless device according to claim 16, wherein the adjusted SINR target is based on the adjusted transmit rate according to:

$$\gamma^{tgt}(k+1) = 2^{\frac{s(k+1)}{w}} - 1$$

where $\gamma^{tgt}(k+1)$ is the adjusted SINR target at step (k+1), and w is the channel bandwidth in Hz.

18. The first wireless device according to claim 11, wherein the receiving circuit further is configured to receive from a network node serving the first wireless device, a configuring parameter co for a common utility function to be used for communication with the second wireless device over the D2D link, which parameter co is a parameter controlling an optimization objective.

19. The first wireless device according to claim 11, wherein the first wireless device and/or the second wireless device are arranged to have no network connection.

20. The first wireless device according to claim 11, wherein the adjusting circuit further is configured to adjust the transmit power for the data channel by increasing or decreasing the transmit power until the SINR measured by the second wireless device, reaches the SINR target or until reaching a maximum transmit power level.

* * * * *